(12) United States Patent
Kim et al.

(10) Patent No.: US 10,909,882 B2
(45) Date of Patent: Feb. 2, 2021

(54) BRAILLE DISPLAY AND ELECTRONIC DEVICE COMPRISING SAME

(71) Applicant: Ju Yoon Kim, Incheon (KR)

(72) Inventors: Ju Yoon Kim, Incheon (KR); Ki Kwang Sung, Goyang-si (KR); Jin Ho Lee, Incheon (KR); Jae Seong Joo, Ulsan (KR); Titus Cheng, Yongin-si (KR)

(73) Assignee: Kim Ju Yoon, Incheon (KR)

( * ) Notice: Subject to any disclaimer, the term of this patent is extended or adjusted under 35 U.S.C. 154(b) by 358 days.

(21) Appl. No.: 15/535,275

(22) PCT Filed: Dec. 11, 2015

(86) PCT No.: PCT/KR2015/013610
§ 371 (c)(1),
(2) Date: Jun. 12, 2017

(87) PCT Pub. No.: WO2016/093666
PCT Pub. Date: Jun. 16, 2016

(65) Prior Publication Data
US 2017/0352291 A1    Dec. 7, 2017

(30) Foreign Application Priority Data
Dec. 12, 2014   (KR) .......................... 10-2014-0179428

(51) Int. Cl.
G09B 21/00        (2006.01)
(52) U.S. Cl.
CPC ................... *G09B 21/004* (2013.01)

(58) Field of Classification Search
CPC .................................................. G09B 21/004
See application file for complete search history.

(56) References Cited

U.S. PATENT DOCUMENTS

| | | | | |
|---|---|---|---|---|
| 3,987,438 A | * | 10/1976 | Lindenmueller | .... G09B 21/004 340/407.1 |
| 4,191,945 A | * | 3/1980 | Hannen | ................ G09B 21/004 340/407.1 |

(Continued)

FOREIGN PATENT DOCUMENTS

| | | |
|---|---|---|
| JP | 1995-271294 A | 10/1995 |
| KR | 10-2003-0012512 A | 2/2003 |

(Continued)

*Primary Examiner* — Xuan M Thai
*Assistant Examiner* — Sadaruz Zaman
(74) *Attorney, Agent, or Firm* — Novick, Kim & Lee, PLLC; Jae Youn Kim (57) ABSTRACT

The present invention relates to a braille display and an electronic device including the same. The braille display according to an aspect of the present invention includes: a base configured to be provided as a perpendicularly polarized plate-shaped magnet and have through holes formed in a perpendicular direction according to a predetermined arrangement; pins configured to be respectively inserted in the through holes so that an upper end of each pin perpendicularly moves between a first position at which the pin protrudes from an upper surface of the base and a second position at which the pin is accommodated in one of the through holes, the pins expressing braille by means of a combination of individual pins located at the first position; and coils configured to be installed to be respectively wound around the pins and move the pins up and down by receiving current and interacting with the magnet.

19 Claims, 8 Drawing Sheets

(56) References Cited

U.S. PATENT DOCUMENTS

| | | | | | |
|---|---|---|---|---|---|
| 4,586,904 | A * | 5/1986 | Chlumsky | G09B 21/003 | 434/114 |
| 4,871,992 | A * | 10/1989 | Petersen | G09B 21/003 | 340/407.1 |
| 5,449,292 | A * | 9/1995 | Tani | G09B 21/004 | 340/4.12 |
| 5,466,154 | A * | 11/1995 | Thompson | G09B 21/003 | 434/114 |
| 5,685,721 | A * | 11/1997 | Decker | G09B 21/003 | 434/114 |
| 6,417,821 | B1 * | 7/2002 | Becker | G09B 21/003 | 340/407.1 |
| 6,734,785 | B2 * | 5/2004 | Petersen | G09B 21/004 | 340/4.12 |
| 6,743,021 | B2 * | 6/2004 | Prince | G09B 21/003 | 434/112 |
| 6,776,619 | B1 * | 8/2004 | Roberts | G09B 21/001 | 340/4.12 |
| 7,723,896 | B2 * | 5/2010 | Esashi | G09B 21/007 | 310/306 |
| 8,740,618 | B2 * | 6/2014 | Shaw | G09B 21/004 | 116/17 |
| 8,770,981 | B2 * | 7/2014 | Schroeder | G09B 21/004 | 434/113 |
| 8,932,061 | B2 * | 1/2015 | Abernethy, Jr. | G09B 21/003 | 434/113 |
| 2002/0050923 | A1 * | 5/2002 | Petersen | G09B 21/004 | 340/407.1 |
| 2004/0110562 | A1 * | 6/2004 | Kajino | G09B 21/004 | 463/36 |
| 2008/0138774 | A1 * | 6/2008 | Ahn | G09B 21/004 | 434/114 |
| 2008/0171308 | A1 * | 7/2008 | Shin | G09B 21/004 | 434/114 |
| 2009/0023116 | A1 | 1/2009 | Shaw | | |
| 2010/0159423 | A1 * | 6/2010 | Hashizume | G06F 3/016 | 434/114 |
| 2014/0356819 | A1 * | 12/2014 | Rodriguez Regalado | G09B 21/004 | 434/114 |
| 2015/0125831 | A1 * | 5/2015 | Chandrashekhar Nair | G09B 21/004 | 434/114 |
| 2015/0379895 | A1 * | 12/2015 | Chari | G09B 21/004 | 434/114 |
| 2017/0200545 | A1 * | 7/2017 | Browne | G06F 1/1652 | |

FOREIGN PATENT DOCUMENTS

| | | |
|---|---|---|
| KR | 10-1181811 B1 | 9/2012 |
| KR | 10-2014-0008823 A | 1/2014 |
| KR | 10-2014-0085734 A | 7/2014 |

* cited by examiner

BRAILLE DISPLAY AND ELECTRONIC DEVICE COMPRISING SAME

TECHNICAL FIELD

The present invention relates to a braille display and an electronic device comprising the same.

BACKGROUND ART

With a recent outstanding development of smart devices including smart phones, smart watches, and smart glasses, people are provided with a convenient environment in their daily lives. However, since most smart devices are based on a visual graphical user interface (GUI), the visually impaired have difficulty in finding a mouse pointer or a touch position and thus have trouble using the smart devices.

Accordingly, a user environment for transmitting information using sound or tactile sensations is needed for the visually impaired to use smart devices.

There has been research and development of a braille display to meet this need. However, conventional braille displays have an endurance limit and slow response speed since pins expressing braille are mechanically moved up and down. Moreover, conventional braille displays cannot recognize whether a visually impaired user has read braille and thus have a limit to displaying various pieces of information by dynamically changing braille.

DETAILED DESCRIPTION OF THE INVENTION

Technical Problem

A problem addressed by the present invention is to provide a braille display having high durability and improved response speed, a method of controlling the same, and an electronic device comprising the same.

Problems to be addressed by the present invention are not limited to the above-stated problem, and problems that have not been stated above will be understood from the description below and the drawings by one of ordinary skill in the art to which this invention belongs.

Technical Solution

According to an aspect of the present invention, there is provided a braille display comprising a base configured to be provided as a perpendicularly polarized plate-shaped magnet and have through holes formed in a perpendicular direction according to a predetermined arrangement; pins configured to be respectively inserted in the through holes so that an upper end of each pin perpendicularly moves between a first position at which the pin protrudes from an upper surface of the base and a second position at which the pin is accommodated in one of the through holes, the pins expressing braille by means of a combination of individual pins located at the first position; and coils configured to be installed to be respectively wound around the pins and move the pins up and down by receiving current and interacting with the magnet.

According to another aspect of the present invention, there is provided an electronic device comprising a braille display comprising a base configured to be provided as a perpendicularly polarized plate-shaped magnet and have through holes formed in a perpendicular direction according to a predetermined arrangement, pins configured to be respectively inserted in the through holes so that an upper end of each pin perpendicularly moves between a first position at which the pin protrudes from an upper surface of the base and a second position at which the pin is accommodated in one of the through holes and configured to express braille by means of a combination of individual pins located at the first position, coils configured to be installed to be respectively wound around the pins and move the pins up and down by receiving current and interacting with the magnet, and a circuit board configured to be provided at a lower surface of the base and to comprise a lead electrically connected to the coils and a switching circuit connecting and disconnecting the lead according to the braille to be expressed; and a control module configured to control the switching circuit based on information about the braille to be expressed.

Solutions to the problems addressed by the present invention are not limited to the above-stated solution and solutions that have not been stated above will be understood from the present application and the drawings by one of ordinary skill in the art to which this invention belongs.

Advantageous Effects of the Invention

According to the present invention, pins expressing braille are quickly moved up and down by supplying current to coils installed at the pins in a state where the pins are accommodated in through holes of a base of a magnetic material, so that braille is displayed at fast speed and durability of a braille display can be increased.

Advantageous effects of the present invention are not limited to the above-stated effects and effects that have not been stated above will be understood from the present application and the drawings by one of ordinary skill in the art to which this invention belongs.

BEST MODE

Embodiments described below are provided to fully explain the spirit of the present invention to one of ordinary skill in the art to which this invention belongs, and therefore, the present invention is not limited to these embodiments. It will be construed that the scope of the invention includes revisions or modifications unless the revisions or modifications depart from the spirit of the invention.

Terms commonly used at present are used in the present application, taking the functions thereof in the present invention into account, but these terms may be changed according to the intentions of one of ordinary skill in the art to which this invention belongs, conventions, or appearance of new technology. When a particular term is arbitrarily defined and used, the meaning of the term will be specifically described. Accordingly, the terms used herein should not be interpreted just based on names but should be interpreted based on their practical meanings and the context of the present application.

The attached drawings are for facilitating the descriptions of the present invention. Shapes in the drawings may be exaggerated for clarity and the present invention is not limited to the drawings.

When it is determined that the detailed descriptions of the structures or functions, which have already known and are relevant to the present invention, may make the substance of the invention vague, the detailed descriptions thereof will be omitted.

According to an aspect of the present invention, there is provided a braille display comprising: a base configured to be provided as a perpendicularly polarized plate-shaped magnet and have through holes formed in a perpendicular direction according to a predetermined arrangement; pins configured to be respectively inserted in the through holes so that an upper end of each pin perpendicularly moves between a first position at which the pin protrudes from an upper surface of the base and a second position at which the pin is accommodated in one of the through holes, the pins expressing braille by means of a combination of individual pins located at the first position; and coils configured to be installed to be respectively wound around the pins and move the pins up and down by receiving current and interacting with the magnet.

The braille display may further comprise a top cover configured to cover the upper surface of the base and have openings at positions respectively corresponding to the through holes to allow only the upper end of each pin to protrude when the pin moves up.

The braille display may further comprise a pin hood installed at the top cover to cover the openings and provided to have elastic quality to allow the upper end of each pin to protrude upward from the base when the pin moves up.

The pin hood may move the pin down using an elastic force thereof when current is not supplied to the coils.

Each of the pins may comprise a body having a pillar shape with a larger diameter than each of the openings and a protrusion extending from an upper surface of the body and having a smaller diameter than each opening so that the protrusion passes through the opening and protrudes from the upper surface of the base when each pin moves up.

A coil groove in which one of the coils is settled may be formed in the body.

A perpendicular length of the coil groove or the coil may be different from a thickness of the base.

The braille display may further comprise a circuit board provided at a lower surface of the base. The circuit board may comprise a lead electrically connected to the coils and a switching circuit connecting and disconnecting the lead according to the braille to be expressed.

The circuit board may be provided as a flexible printed circuit board and may locate the pins at the second position using an elastic force thereof when the current is not supplied to the coils.

The braille display may further comprise an elastic member configured to locate the pins at the second position using an elastic force thereof when the current is not supplied to the pins.

The braille display may further comprise a bottom cover configured to cover a lower surface of the circuit board.

The braille display may further comprise a sensor configured to sense a position of each of the pins in the perpendicular direction.

The braille display may further comprise an upper plate and a lower plate which are respectively attached to the upper surface of the base and a lower surface of the base to concentrate a magnetic field of the magnet of the base and enforce the interaction between the coils receiving the current and the magnet.

According to another aspect of the present invention, there is provided an electronic device comprising a braille display comprising a base configured to be provided as a perpendicularly polarized plate-shaped magnet and have through holes formed in a perpendicular direction according to a predetermined arrangement, pins configured to be respectively inserted in the through holes so that an upper end of each pin perpendicularly moves between a first position at which the pin protrudes from an upper surface of the base and a second position at which the pin is accommodated in one of the through holes and configured to express braille by means of a combination of individual pins located at the first position, coils configured to be installed to be respectively wound around the pins and move the pins up and down by receiving current and interacting with the magnet, and a circuit board configured to be provided at a lower surface of the base and to comprise a lead electrically connected to the coils and a switching circuit connecting and disconnecting the lead according to the braille to be expressed; and a control module configured to control the switching circuit based on information about the braille to be expressed.

The control module may obtain text information and convert the text information into the braille to be expressed.

The text information may comprise at least one piece of information among visual information, a text message, and geographic information.

The electronic device may further comprise a communication module configured to receive information comprising the text information from outside.

The electronic device may further comprise memory configured to store the text information.

The braille display may further comprise an upper plate and a lower plate which are respectively attached to the upper surface and the lower surface of the base to concentrate a magnetic field of the magnet of the base and enforce the interaction between the coils receiving the current and the magnet.

Solutions to the problems addressed by the present invention are not limited to the above-stated solutions and solutions that have not been stated above will be understood from the present application and the drawings by one of ordinary skill in the art to which this invention belongs.

MODE OF THE INVENTION

Hereinafter, an electronic device 100 including a braille display 1000 according to an embodiment of the present invention will be described. Here, the electronic device 100 is a device which displays various pieces of information in braille using the braille display 1000. The electronic device 100 may be implemented as a portable device such as a smart phone or a smart watch.

Figure 1:
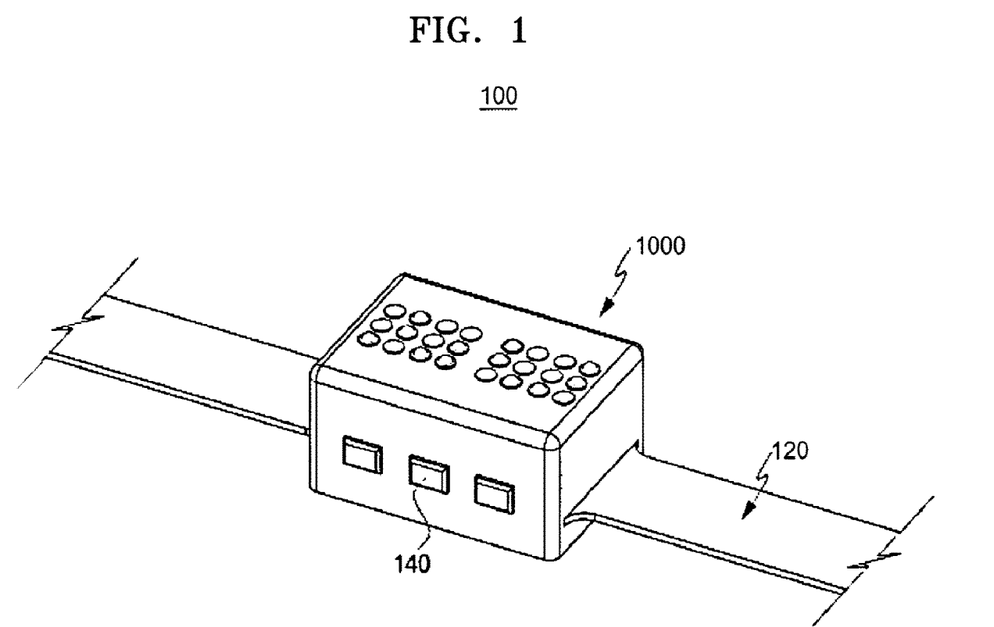
FIG. 1 is a perspective view of an electronic device including a braille display according to an embodiment of the present invention.

FIG. 1 is a perspective view of the electronic device 100 including the braille display 1000 according to an embodiment of the present invention. Although the electronic device 100 has a form of a smart watch in FIG. 1, the form of electronic device 100 is not limited thereto.

Referring to FIG. 1, the electronic device 100 may include the braille display 1000, a watch strap 120, a button unit 140, and a speaker (not shown). The electronic device 100 may be worn around a user's wrist using the watch strap 120 like an ordinary watch. The braille display 1000 may display various pieces of information in braille. A user reads the braille display 1000 using the fingers and receives the displayed information. A representative example of the information may be time information. Besides, the braille display 1000 may display text content stored in internal memory in braille or may display other various pieces of information, such as a text message, weather information, and map information received from outside, in braille.

To receive the information, the electronic device 100 may additionally include an appropriate communication module (not shown).

The button unit 140 may receive user input for controlling various operations of the braille display 1000. For example, a user may control an operation, such as control of the operating speed of the braille display 1000, control of the volume of the speaker (not shown), or conversion of the operating mode of the electronic device 100 from a time display mode to a weather display mode, by pressing a particular button. It is apparent that other functions may be assigned to the button unit 140 when necessary.

The speaker (not shown) may output sound. For example, when a user has set an alarm to a specified time or when a text message is externally received, sound notifying this event may be output from the speaker (not shown). Meanwhile, a vibration module (not shown) instead of the speaker (not shown) may be added to the electronic device 100 to give an alarm to a user through vibration.

Hereinafter, the braille display 1000 displaying information in the electronic device 100 will be described in detail.

The braille display 1000 is a device displaying braille by moving pins 1200 up and down. Braille is a letter system for the visually impaired, in which a character is represented by a predetermined combination of raised dots on paper and the visually impaired are able to read by feeling the dots with their fingers. The braille display 1000 is a device which accommodates the pins 1200 in a body 1220 and displays script by representing raised dots with raised pins 1200.

Figure 2:
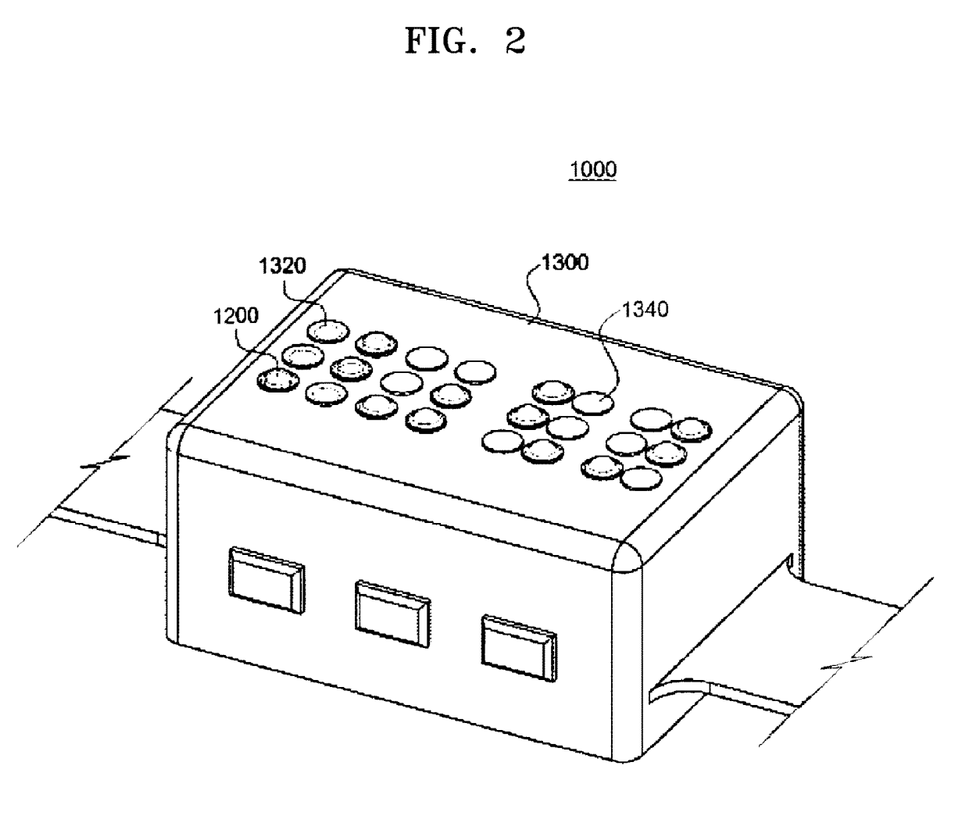
FIG. 2 is a perspective view of a braille display according to an embodiment of the present invention.
Figure 3:
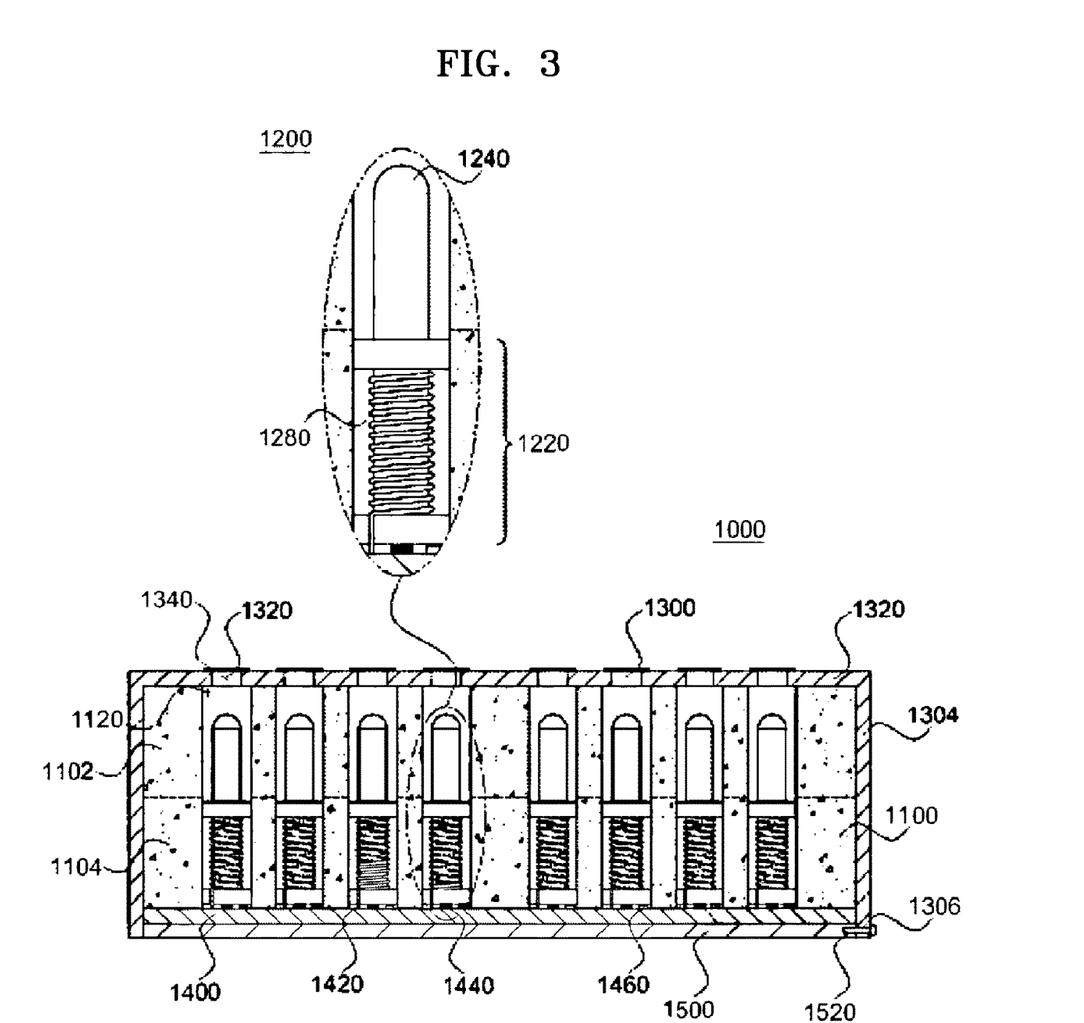
FIG. 3 is a cross-sectional view of a braille display according to an embodiment of the present invention.
Figure 4:
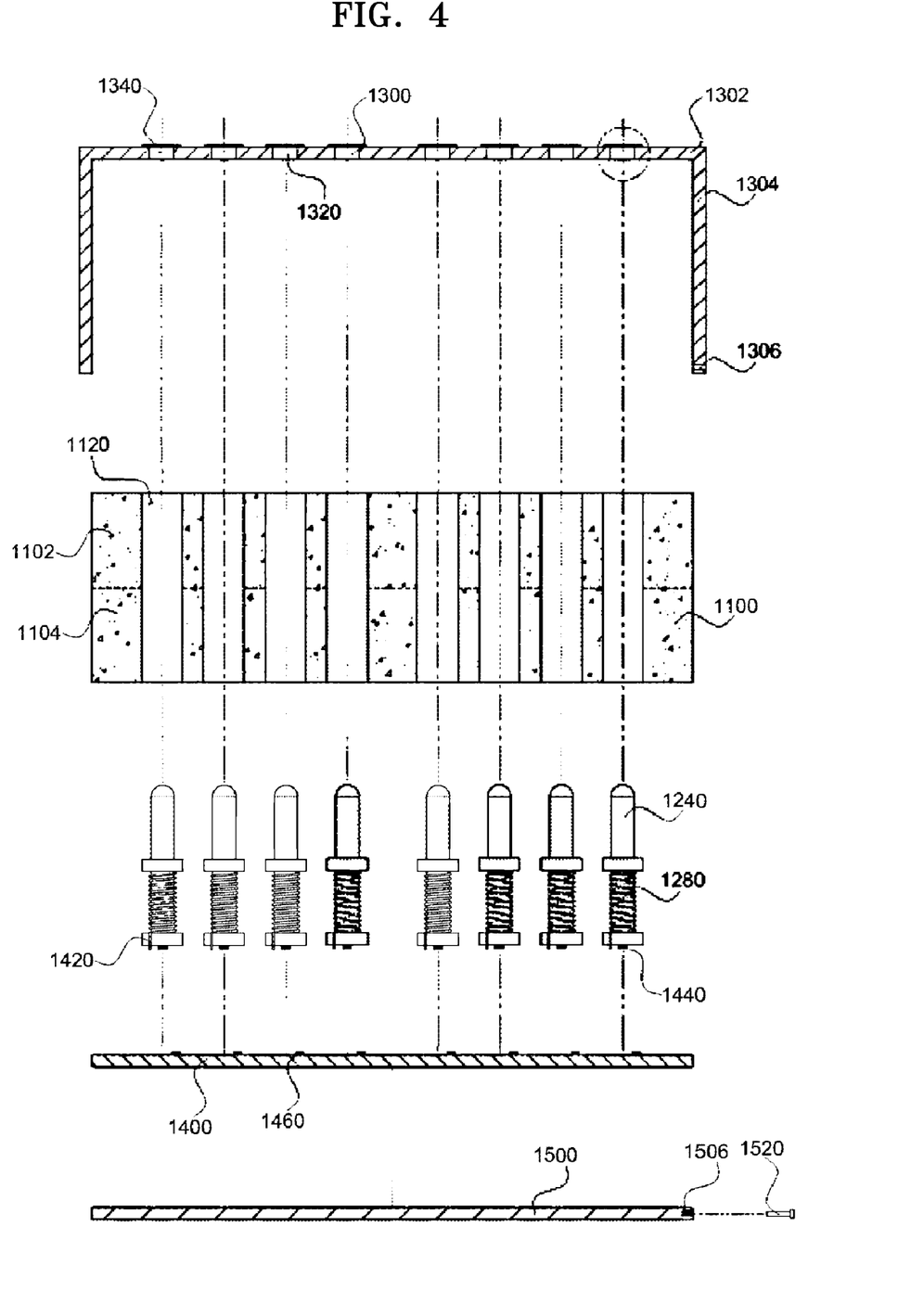
FIG. 4 is an exploded cross-sectional view of a braille display according to an embodiment of the present invention.

FIG. 2 is a perspective view of the braille display 1000 according to an embodiment of the present invention. FIG. 3 is a cross-sectional view of the braille display 1000 according to an embodiment of the present invention. FIG. 4 is an exploded cross-sectional view of the braille display 1000 according to an embodiment of the present invention.

Referring to FIGS. 2 through 4, the braille display 1000 may include a base 1100, a pin 1200, a coil 1280, a top cover 1300, a substrate 1400, and a bottom cover 1500.

The base 1100 may be provided in a plate shape. In detail, the base 1100 may have a pair of principal surfaces, i.e., an upper surface and a lower surface, facing each other and side surfaces connecting the upper surface with the lower surface.

The base 1100 may be provided as a permanent magnet of which the N- and S-poles are polarized along the thickness direction (hereinafter, referred to as a perpendicular direction) of the plate. Accordingly, an upper portion 1102 and a lower portion 1104 may be positioned as the N-pole and the S-pole, respectively, around a central line along the perpendicular direction of the base 1100 or the upper portion 1102 and the lower portion 1104 may be positioned as the S-pole and the N-pole, respectively.

A plurality of through holes 1120 may be formed in the base 1100 to express braille. The through holes 1120 may be formed by perforating the base 1100 from the upper surface to the lower surface thereof. For example, a through hole 1120 may be formed in the shape of a cylindrical pillar with a central line in the perpendicular direction. It is also possible to change the shape of the through hole 1120 into a canted column or an elliptic cylinder when necessary.

The pins 1200 which will be described below may be respectively accommodated in the through holes 1120.

The through holes 1120 may be arranged to be suitable to express braille. A braille character is usually represented by a combination of existence and non-existence of raised dots at respective six positions arranged in two rows and three columns, and therefore, the through holes 1120 may be arranged so that through holes 1120 arranged in two rows and three columns viewed from above the base 1100 form one character unit. For example, the through holes 1120 may be arranged in four unit groups, each of which has two rows and three columns to represent one character, with a predetermined gap, as shown in FIG. 2. Such arrangement enables four characters to be expressed in braille at a time and may be useful for representing, for example, hours and minutes. It is apparent that the arrangement and the number of through holes 1120 may be changed according to braille to be expressed.

A pin 1200 may be inserted in a through hole 1120 of the base 1100 so that the pin 1200 moves up and down. The pin 1200 may include a body 1220 of the pin 1200 and a protrusion 1240.

Here, the coil 1280, which will be described below, may be wound around the body 1220, so that when current is supplied to the coil 1280, the coil 1280 may act as an electromagnet and interact with the magnetic pole of the base 1100 to move the pin 1200 up and down. Accordingly, it is preferable that the body 1220 is made of a metallic material. The protrusion 1240 may protrude upward from the base 1100 according to up and down movement of the pin 1200, thereby performing a function representing a raised dot in braille.

The body 1220 may be provided as a pillar in the perpendicular direction, and the protrusion 1240 may extend upward from the upper surface of the body 1220. Here, the body 1220 may be provided in a pillar shape (e.g., a cylinder) which has a diameter that is substantially the same as or a little smaller than the diameter of the through hole 1120 and larger than the diameter of the top cover 1300 which will be described below. The protrusion 1240 may be provided in a pillar shape (i.e., a cylinder) which has a diameter smaller than the diameter of the body 1220 and smaller than the diameter of an opening 1320 of the top cover 1300, which will be described below. In such structure, when the pin 1200 moves up, the body 1220 does not pass through the opening 1320 of the top cover 1300 while the protrusion 1240 of the pin 1200 passes through the opening 1320, so that an upper end of the pin 1200 may reliably protrude upward from the base 1100.

A coil groove may be provided in the body 1220. The coil groove 1260 may be formed in a form of a dent in the body 1220. The coil 1280 may be put in the coil groove 1260 to be installed at the body 1220. Since the coil groove 1260 has a form of a dent in the body 1220, a sill may be formed at each of the upper and lower ends of the coil groove 1260 so that the coil 1280 put in the coil groove 1260 can be settled. Meanwhile, the length of the coil groove 1260 in the perpendicular direction may be less than the thickness of the base 1100 for the up and down movement of the pin 1200, which will be described below.

Meanwhile, an upper end of the protrusion 1240 may have a curved surface. When the pin 1200 moves up and protrudes from the base 1100, a user feels the upper end of the protrusion 1240 with his/her fingers to read. Since the upper end of the protrusion 1240 has a curved surface, the user may be given a smooth feeling.

The coil 1280 may be put in the coil groove 1260 of the body 1220. The coil 1280 may be connected to a lead 1420 of the substrate 1400, which will be described below, and may be supplied with current.

When current is supplied to the coil 1280, the body 1220 acts as an electromagnet, and therefore, the magnetism of the base 1100 interacts with the body 1220 which is an electromagnet, so that the pin 1200 can be moved up or down. For example, when forward current is supplied to the coil 1280, an upper part of the body 1220 may become the N-pole and a lower part thereof may become the S-pole. When backward current is supplied to the coil 1280, the upper part of the body 1220 may become the S-pole and the lower part thereof may become the N-pole. An opposite example is apparently possible that the upper and lower parts of the body 1220 may respectively become the S-pole and the N-pole when forward current is supplied to the coil 1280 and may respectively become the N-pole and the S-pole when backward current is supplied to the coil 1280.

To allow the coil 1280 to move up and down the pin 1200 as described above, the coil 1280 may be provided to have a perpendicular length which is different from the thickness of the base 1100.

The top cover 1300 may be provided to cover the upper surface of the base 1100.

For example, the top cover 1300 may be provided in a box form with an open bottom so that the upper surface of the top cover 1300 can cover the upper surface of the base 1100 and a sidewall 1304 of the top cover 1300 can cover the side of the base 1100, as shown in FIGS. 2 and 3. A coupling groove 1306 may be formed at a lower end of the sidewall 1304 of the top cover 1300 so that the coupling groove 1306 can be coupled with a coupling groove 1506 of the bottom cover 1500 by a screw 1520 or the like. Accordingly, the top cover 1300 and the bottom cover 1500 may function as a casing or a housing which accommodates other elements of the braille display 1000. Differently from the description above, the top cover 1300 may be provided as a sheet simply covering only the upper surface of the base 1100.

The opening 1320 may be formed in the top cover 1300 at a position corresponding to the through hole 1120. A diameter of the opening 1320 may be less than the diameter of the through hole 1120. As explained above in the description of the pin 1200, a diameter of the opening 1320 may also be smaller than the diameter of the body 1220 of the pin 1200 and larger than the diameter of the protrusion 1240 of the pin 1200. Accordingly, the opening 1320 prevents the pin 1200 from fully escaping from the base 110 and allows only the protrusion 1240 to pass through when the pin 1200 moves up, so that only the upper end of the pin 1200 may be allowed to protrude upward from the base 1100.

A pin hood 1340 may be provided for the opening 1320 of the top cover 1300. For example, the pin hood 1340 may be attached to the top cover 1300 to cover the fringe of the opening 1320. Accordingly, the pin hood 1340 covers the opening 1320 so that foreign substances can be prevented from entering the base 1100.

Although it has been described that the pin hood 1340 is installed at each opening 1320, it is also possible that the pin hood 1340 is provided as a sheet of flexible quality to blanket the top cover 1300.

The substrate 1400 may be provided as a flexible printed circuit board (FPCB). The substrate 1400 as a FPCB may be placed at the bottom of the base 1100.

The substrate 1400 may supply current to the coil 1280 and may control the up and down movement of the pin 1200 according to braille to be expressed, using the supply of current. The substrate 1400 may also sense whether the pin 1200, which is raised and recognized as a raised dot in braille, has been read by a user with his/her fingers.

In detail, the lead 1420, a switching circuit, a control module (not shown), a communication module (not shown), a spring 1440, and a sensor 1460 may be installed at the substrate 1400.

The lead 1420 may be electrically connected to the coil 1280 to supply current to the coil 1280. The lead 1420 may receive power from a battery (not shown) or an external power supply and may transmit the power to the coil 1280. Meanwhile, the lead 1420 may be provided to have a length with a predetermined margin so that the connection can be maintained even when current is supplied to the coil 1280 and the pin 1200 is moved up and down.

The switching circuit may connect and disconnect the lead 1420. As the lead 1420 is connected and disconnected according to the control of the switching circuit, supply or non-supply of current to the coil 1280 is controlled, so that braille to be expressed may be displayed by way of up and down movement of the pin 1200.

The control module (not shown) may control the switching circuit according to braille to be expressed. The control module (not shown) may be implemented as an electronic circuit or an electronic chip which performs processing, an operation, and saving of various pieces of information. In detail, the control module (not shown) may determine a character to be expressed, may determine which pins 1200 in a group (e.g., a group of 2×3 pins 1200) will protrude to express the character in braille, and may transmit a control signal to the switching circuit according to the determination. The switching circuit receiving the control signal may connect or disconnect the lead 1420 so that current can or cannot be supplied to the coil 1280 in each pin 1200, thereby controlling the up and down movement of the pin 1200. As a result, the braille character is presented to a user.

Meanwhile, the control module (not shown) may obtain braille to be expressed from text stored in memory (not shown) included in or existing separately from the control module (not shown).

Alternatively, the control module (not shown) may receive information about braille to be expressed from the communication module (not shown). The control module (not shown) may obtain the information about braille to be expressed by obtaining text information and converting the text information into braille.

At this time, the communication module (not shown) may be a 3G or 4G mobile communication module; a short-range communication module such as WiFi, Bluetooth, or ZigBee; or a GPS module receiving a GPS signal. For example, the communication module (not shown) may receive a text message through a cell network and the control module may convert the received text into braille to be expressed and control the switching circuit to control the pins 1200 to move up and down, so that braille can be displayed.

Meanwhile, the control module (not shown) or the communication module (not shown) may not need to be integrated into the braille display 1000 but may be provided to the electronic device 100 as an external element of the braille display 1000 when necessary.

The spring 1440 may be installed at the substrate 1400 and connected to the bottom surface of each pin 1200. The spring 1440 may allow the pin 1200 to be accommodated in the base 1100 when an external force is not applied to the pin 1200. When current is supplied to the coil 1280 in this state, the pin 1200 may move up against the elastic force of the spring 1440 so that the upper end of the pin 1200 can protrude from the upper surface of the base 1100. When the supply of current to the coil 1280 is interrupted in a state where the upper end of the pin 1200 has protruded, the pin 1200 may be re-accommodated in the base 1100 due to the elastic force of the spring 1440.

The sensor 1460 may sense an input of a user's touch on the pin 1200 protruding upward from the base 1100, i.e., the pin 1200 functioning as a raised dot in braille. For example, the sensor 1460 may be a position sensor which is installed on the upper surface of the substrate 1400, as shown in FIG. 3, to sense a perpendicular distance up to the bottom surface of the pin 1200. A representative example of the sensor 1460 may be an infrared sensor. Besides, the sensor 1460 may be provided as a mechanical or an electronic sensor.

In detail, the sensor 1460 may sense a perpendicular position of the pin 1200. The pin 1200 may move between a position (hereinafter, referred to as an 'off position') at which the pin 1200 is accommodated in the base 1100 due to the spring 1440 and a position (hereinafter, referred to as an 'on position') at which the upper end of the pin 1200 protrudes upward from the base 1100 when current is supplied to the coil 1280. When the pin 1200 at the on position is felt by a user using the fingers to read, the pin 1200 may be placed at a position (hereinafter, referred to as a 'touch position') lower than the on position while the upper end of the pin 1200 stays protruding upward from the base 1100. The sensor 1460 may sense the position of the pin 1200 and detect at which of the on position, the off position, and the touch position the pin 1200 is placed. Consequently, the sensor 1460 may sense whether the pin 1200 at the on position has been touched, i.e., read by a user with the fingers.

Figure 5:
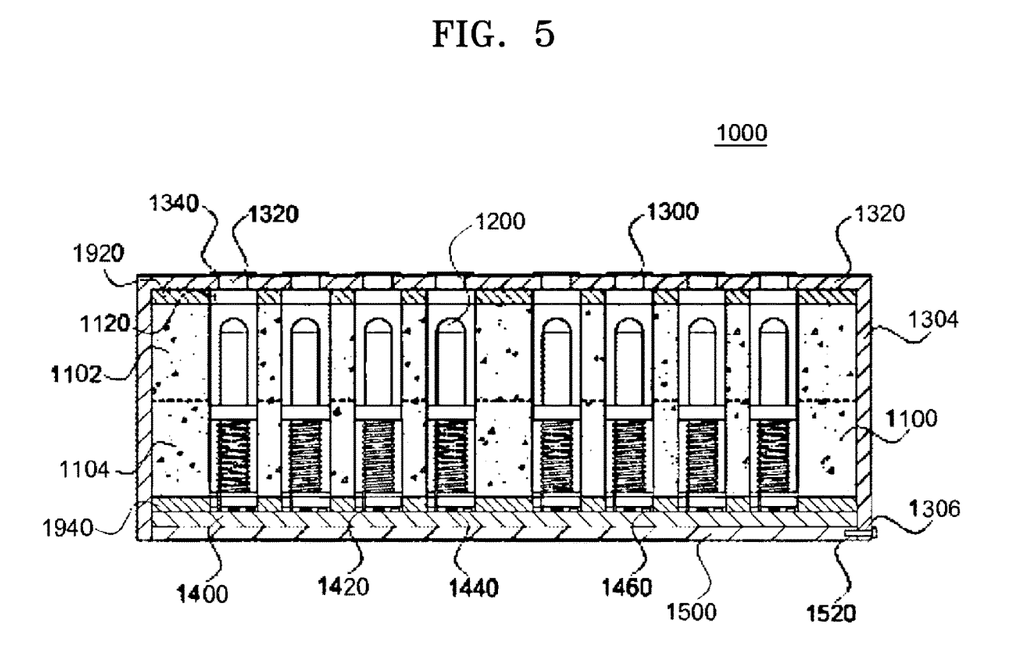
FIG. 5 is a cross-sectional view of a braille display according to a modification of the present invention.

Meanwhile, in the above-described braille display 1000, the pin 1200 may be moved up and down when the coil 1280 acts as an electromagnet and interacts with the permanent magnet of the base 1100 when the coil 1280 receives current. At this time, to enforce the interaction, an upper surface plate 1920 and a lower surface plate 1940 may be added to the upper surface and the lower surface, respectively, of the base 1100.

FIG. 5 is a cross-sectional view of the braille display 1000 according to a modification of the present invention.

As the upper surface plate 1920 and the lower surface plate 1940 are attached to the upper surface and the lower surface, respectively, of the base 1100 to be located at the top and bottom of the magnet so that lines of magnetic force generated at the coil 1280 can be concentrated, the pin 1200 is allowed to smoothly move up and down.

A hole corresponding to each pin 1120 may apparently be bored through the upper surface plate 1920 and the lower surface plate 1940.

The braille display 1000 may also include an upper plate and a lower plate which are attached to the upper surface and the lower surface, respectively, of the base 1100 to concentrate the magnetic field of the magnet of the base 1100, thereby enforcing the interaction between the coil 1280 receiving current and the magnet.

Hereinafter, the operation of the braille display 1000 according to an embodiment of the present invention will be described.

The braille display 1000 displays braille using the up and down movement of each pin 1200. The pin 1200 may move between the on position at which the pin 1200 is moved up and read as a raised dot in braille and the off position at which the pin 1200 is moved down and read as a non-raised dot in braille.

Figure 6:
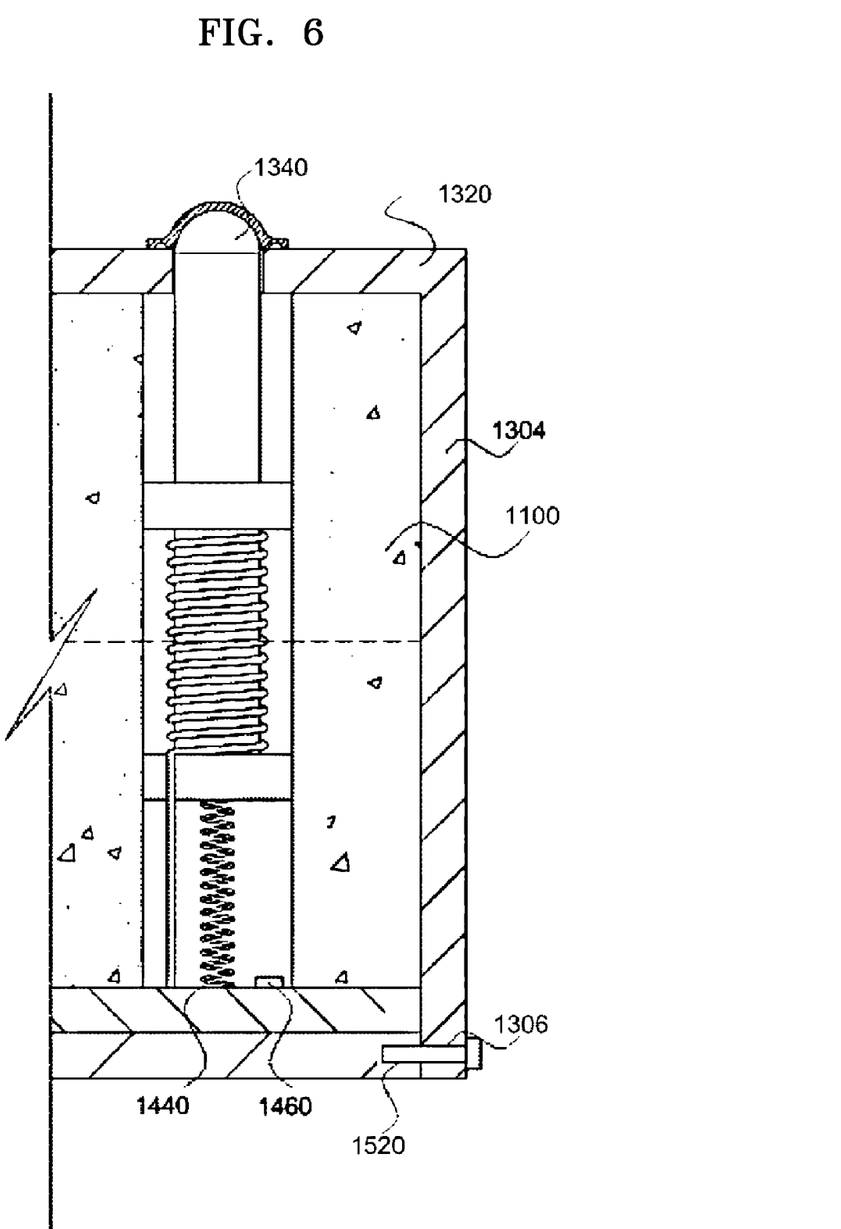
FIG. 6 is a diagram showing the off position of a pin in a braille display according to an embodiment of the present invention.
Figure 7:
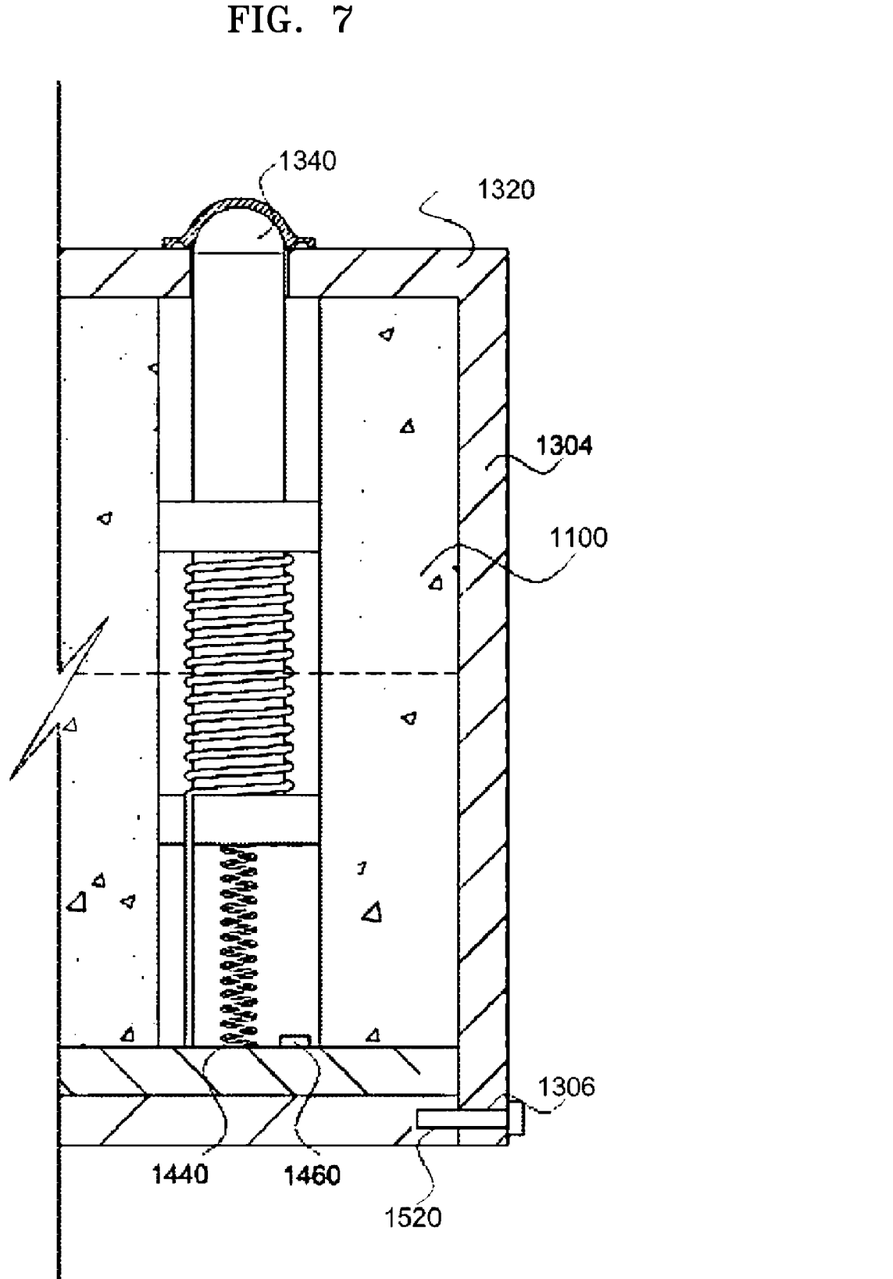
FIG. 7 is a diagram showing the on position of a pin in a braille display according to an embodiment of the present invention.

FIG. 6 is a diagram showing the off position of the pin 1200 in the braille display 1000 according to an embodiment of the present invention. FIG. 7 is a diagram showing the on position of the pin 1200 in the braille display 1000 according to an embodiment of the present invention.

Firstly, the pin 1200 may be located at the off position when current is not supplied to the coil 1280. When current does not flow in the coil 1280, the pin 1200 does not receive an external force from the magnet of the base 1100. In this state, only the elastic force of the spring 1440 is applied to the pin 1200. Accordingly, it is designed that the pin 1200 is fully accommodated in the through hole 1120 when the spring 1440 has no elastic deformation, so that the pin 1200 is located at the off position at which the pin 1200 does not protrude from the base 1100 when current does not flow in the coil 1280.

When necessary the spring 1440 may be omitted from the braille display 1000 and the pin 1200 may be accommodated in the through hole 1120 at the off position due to its own weight when current is not supplied to the coil 1280. Alternatively, even if the spring 1440 is omitted, the pin 1200 may be located at the off position due to the restoring force of the lead 1420 or the substrate 1400 provided with ductile quality when current is not supplied to the coil 1280.

Meanwhile, when the pin 1200 is located at the off position, the sensor 1460 may sense a perpendicular length up to the bottom surface of the pin 1200 and the control module (not shown) may determine that the pin 1200 is located at the off position based on the fact that the sensed distance is shorter than a predetermined distance.

Thereafter, when current is supplied to the coil 1280, the pin 1200 may be located at the on position. When the current is supplied to the coil 1280, the body 1220 of the pin 1200 acts as an electromagnet. At this time, the current may be supplied in a direction (hereinafter, referred to as a forward direction) which allows the polarity order of the upper and lower part of the body 1220 of the pin 1200 to be reverse to the polarity order of the upper portion 1102 and the lower portion 1104 of the base 1100. For example, when the upper portion 1102 and the lower portion 1104 are respectively the N-pole and the S-pole in the base 1100, the forward current may allow the upper and lower part of the body 1220 of the pin 1200 to be respectively the S-pole and the N-pole. In the same manner, when the upper portion 1102 and the lower portion 1104 are respectively the S-pole and the N-pole in the base 1100, the forward current may allow the upper and lower part of the body 1220 of the pin 1200 to be respectively the N-pole and the S-pole.

When the forward current is supplied as described above, the upper part of the coil groove 1260 receives an attractive force from the upper portion 1102 of the base 1100 and a repulsive force from the lower portion 1104 of the base 1100. In the same manner, the lower part of the coil groove 1260 receives an attractive force from the lower portion 1104 of the base 1100 and a repulsive force from the upper portion 1102 of the base 1100. Accordingly, the pin 1200 moves along the perpendicular direction so that the center of the coil groove 1260 is level with the center of the base 1100. It is apparent that the current supplied to the pin 1200 needs to be large enough to move the pin 1200 against the elastic force of the spring 1440.

Here, a perpendicular length of each of the coil 1280 and the coil groove 1260 of the body 1220 wound with the coil 1280 is less than the thickness of the base 1100, and the center of the coil groove 1260 is lower in the perpendicular direction than the center of the base 1100 at the off position, and therefore, the pin 1200 moves up in the perpendicular direction until the center of the coil groove 1260 is level with the center of the base 1100 when the forward current is supplied to the coil 1280. When the pin 1200 moves up as described above, the protrusion 1240 extending from the upper surface of the body 1220 of the pin 1200 passes through the opening 1320 and protrudes upward from the base 1100, thereby representing a raised dot in braille. When the pin 1200 moves up, the pin hood 1340 having elasticity may be elastically deformed by the pin 1200.

Meanwhile, since the opening 1320 is bored to be smaller than the body 1220, the body 1220 of the pin 1200 does not pass through the opening 1320 even when large current is supplied so that the pin 1200 moves up at an excessive speed, and therefore, the pin 1200 is prevented from escaping from the through hole 1120. It is apparent that the spring 1440 installed at the bottom surface of the pin 1200, the pin hood 1340 covering the opening 1320, the lead 1420 connected to the coil 1280, and the FPCB 1400 connected to the lead 1420 may prevent the pin 1200 from escaping.

When the pin 1200 is located at the on position as described above, the sensor 1460 may sense the perpendicular length up to the bottom surface of the pin 1200 and the control module (not shown) may determine that the pin 1200 is located at the on position based on the fact that the sensed distance is longer than the predetermined distance.

When the current to the coil 1280 is cut off with respect to the pin 1200 located at the on position, the pin 1200 is moved back to the off position by the elastic force of the spring 1440. At this time, instead of cutting off the current to the coil 1280, it is possible to supply current to the coil 1280 in a direction (hereinafter, referred to as 'backward direction') opposite to the forward direction to allow the pin 1200 to move down fast, when necessary. When the backward current is supplied, the upper part of the coil groove 1260 receives a repulsive force from the upper portion 1102 of the base 1100 and an attractive force from the lower portion 1104 of the base 1100 and the lower part of the coil groove 1260 receives a repulsive force from the lower portion 1104 of the base 1100 and an attractive force from the upper portion 1102 of the base 1100, and therefore, the pin 1200 moves out of the on position. The pin 1200 may not move up but may be allowed to move down due to the elastic force of the spring 1440. When the pin 1200 is moved down using the backward current as described above, the current may be continuously supplied until the pin 1200 reaches the off position. Alternatively, the backward current may be momentarily supplied for a short time.

Figure 8:
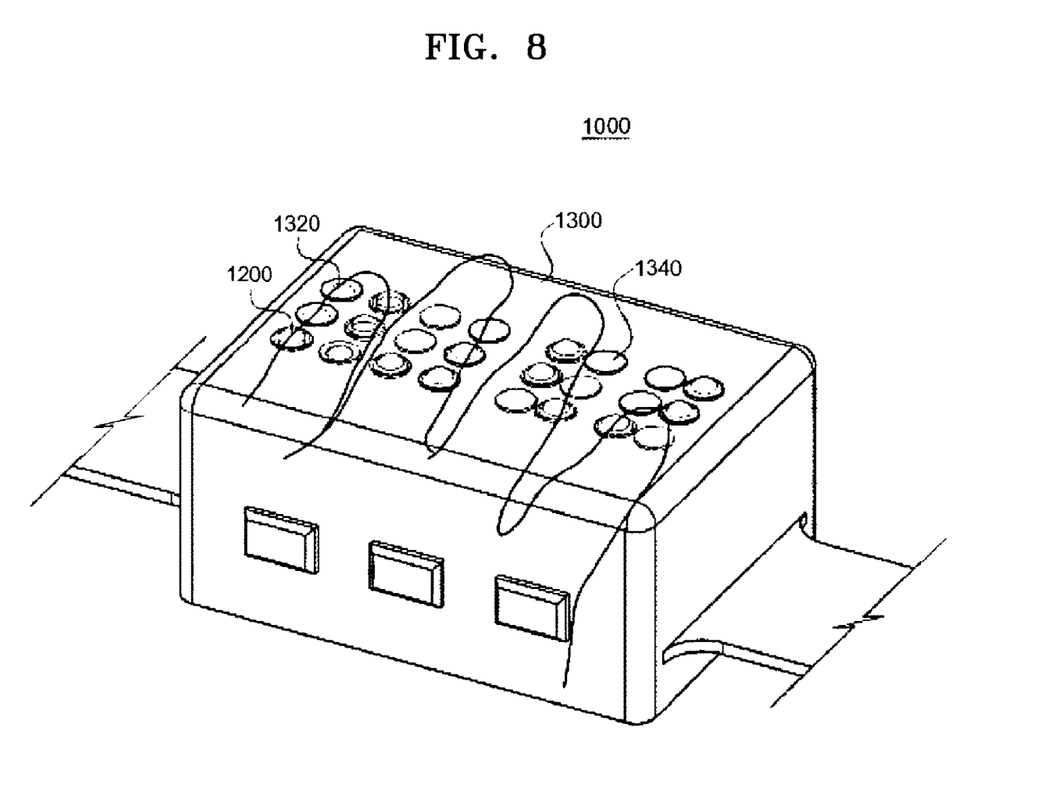
FIG. 8 is a diagram of a procedure for reading a braille display with the fingers according to an embodiment of the present invention.

FIG. 8 is a diagram of a procedure for reading the braille display 1000 with the fingers according to an embodiment of the present invention.

When a user reads braille from the braille display 1000, the user may usually recognize braille while reading the pins 1200 of the braille display 1000 from left to right using the fingers. However, when the braille display 1000 according to an embodiment of the present invention is used, a user may recognize braille according to the up and down movement of the pins 1200 while the user puts the fingers on the through holes 1120, as shown in FIG. 8. When the up and down movement of the pins 1200 is updated to display next braille text, the user may continuously read braille without moving the fingers.

INDUSTRIAL APPLICABILITY

The above description just exemplarily explains the technical spirit of the present invention. Various changes and modifications may be made by one of ordinary skill in the art to which this invention belongs without departing from the original characteristics of the invention. Therefore, the above-described embodiments of the present invention may be implemented individually or in combinations thereof.

Accordingly, the disclosed embodiments of the invention should be considered in descriptive sense only and not for purposes of limitation. The scope of the present invention should not be limited to these embodiments. The protected scope of the invention should be construed as defined by the appended claims and the scope of the invention should be construed as including all technical ideas within a range equivalent to the claims.

The invention claimed is:

1. A braille display comprising:
a base having a perpendicularly polarized plate-shaped magnet and a plurality of through holes formed therein in a perpendicular direction according to a predetermined arrangement;
a plurality of pins movably disposed in the plurality of through holes so that an upper end of each pin perpendicularly moves between a first position at which the pin protrudes from an upper surface of the base and a second position at which the pin is accommodated in one of the plurality of through holes, the plurality of pins expressing braille by means of a combination of pins located at the first position; and
a plurality of coils respectively wound around the plurality of pins so as to move each pin up and down when receiving current by interacting with the magnet of the base,
wherein when the current is supplied to each coil, each pin wound by each coil acts as an electromagnet and interacts with a magnetic pole of the base to move each pin up and down,
wherein the base is provided as a permanent magnet, at least a portion of the permanent magnet of the base being formed longer than each pin so as to surround the whole areas of each pin and each coil in the longitudinal direction, and
wherein the flow of the current is controlled to move each pin up and down.

2. The braille display of claim 1, further comprising a top cover configured to cover the upper surface of the base and have openings at positions respectively corresponding to the through holes to allow only the upper end of each pin to protrude when the pin moves up.

3. The braille display of claim 2, further comprising a pin hood disposed on the top cover to cover the openings and provided to have elastic quality to allow the upper end of each pin to protrude upward from the base when the pin moves up.

4. The braille display of claim 3, wherein the pin hood moves the pin down using an elastic force thereof when the current is not supplied to the coils.

5. The braille display of claim 2, wherein each of the pins comprises a body having a pillar shape with a larger diameter than each of the openings and a protrusion extending from an upper surface of the body and having a smaller diameter than each opening so that the protrusion passes through the opening and protrudes from the upper surface of the base when each pin moves up.

6. The braille display of claim 5, wherein a coil groove in which one of the coils is settled is formed in the body.

7. The braille display of claim 6, wherein a perpendicular length of the coil groove or the coil is different from a thickness of the base.

8. The braille display of claim 1, further comprising a circuit board provided at a lower surface of the base, the circuit board comprising a lead electrically connected to the coils and a switching circuit connecting and disconnecting the lead according to the braille to be expressed.

9. The braille display of claim 8, wherein the circuit board is provided as a flexible printed circuit board and locates the pins at the second position using an elastic force thereof when the current is not supplied to the coils.

10. The braille display of claim 8, further comprising an elastic member configured to locate the pins at the second position using an elastic force thereof when the current is not supplied to the pins.

11. The braille display of claim 8, further comprising a bottom cover configured to cover a lower surface of the circuit board.

12. The braille display of claim 1, further comprising a sensor configured to sense a position of each of the pins in the perpendicular direction.

13. The braille display of claim 1, further comprising an upper plate and a lower plate which are respectively attached to the upper surface of the base and a lower surface of the base to concentrate a magnetic field of the magnet of the base and enforce the interaction between the coils receiving the current and the magnet.

14. An electronic device comprising:
a braille display including a base having a perpendicularly polarized plate-shaped magnet and a plurality of through holes formed therein in a perpendicular direction according to a predetermined arrangement, a plurality of pins movably disposed in the plurality of through holes so that an upper end of each pin perpendicularly moves between a first position at which the pin protrudes from an upper surface of the base and a second position at which the pin is accommodated in one of the plurality of through holes to express braille by means of a combination of pins located at the first position, a plurality of coils respectively wound around the plurality of pins so as to move each pin up and down when receiving current by interacting with the magnet of the base, and a circuit board disposed at a lower surface of the base and having a lead electrically connected to the plurality of coils and a switching circuit connecting and disconnecting the lead according to the braille to be expressed; and
a control module configured to control the switching circuit based on information about the braille to be expressed,
wherein when the current is supplied to each coil, each pin wound by each coil acts as an electromagnet and interacts with a magnetic pole of the base to move each pin up and down,
wherein the base is provided as a permanent magnet, at least a portion of the permanent magnet of the base being formed longer than each pin so as to surround the whole areas of each pin and each coil in the longitudinal direction, and
wherein the flow of the current is controlled to move each pin up and down.

15. The electronic device of claim 14, wherein the control module obtains text information and converts the text information into the braille to be expressed.

16. The electronic device of claim 15, wherein the text information comprises at least one piece of information selected from the group consisting of visual information, a text message, and geographic information.

17. The electronic device of claim 15, further comprising a communication module configured to receive information comprising the text information from outside.

18. The electronic device of claim 15, further comprising memory configured to store the text information.

19. The electronic device of claim 14, wherein the braille display further comprises an upper plate and a lower plate which are respectively attached to the upper surface and the lower surface of the base to concentrate a magnetic field of the magnet of the base and enforce the interaction between the coils receiving the current and the magnet.

* * * * *